United States Patent Office 3,748,150
Patented July 24, 1973

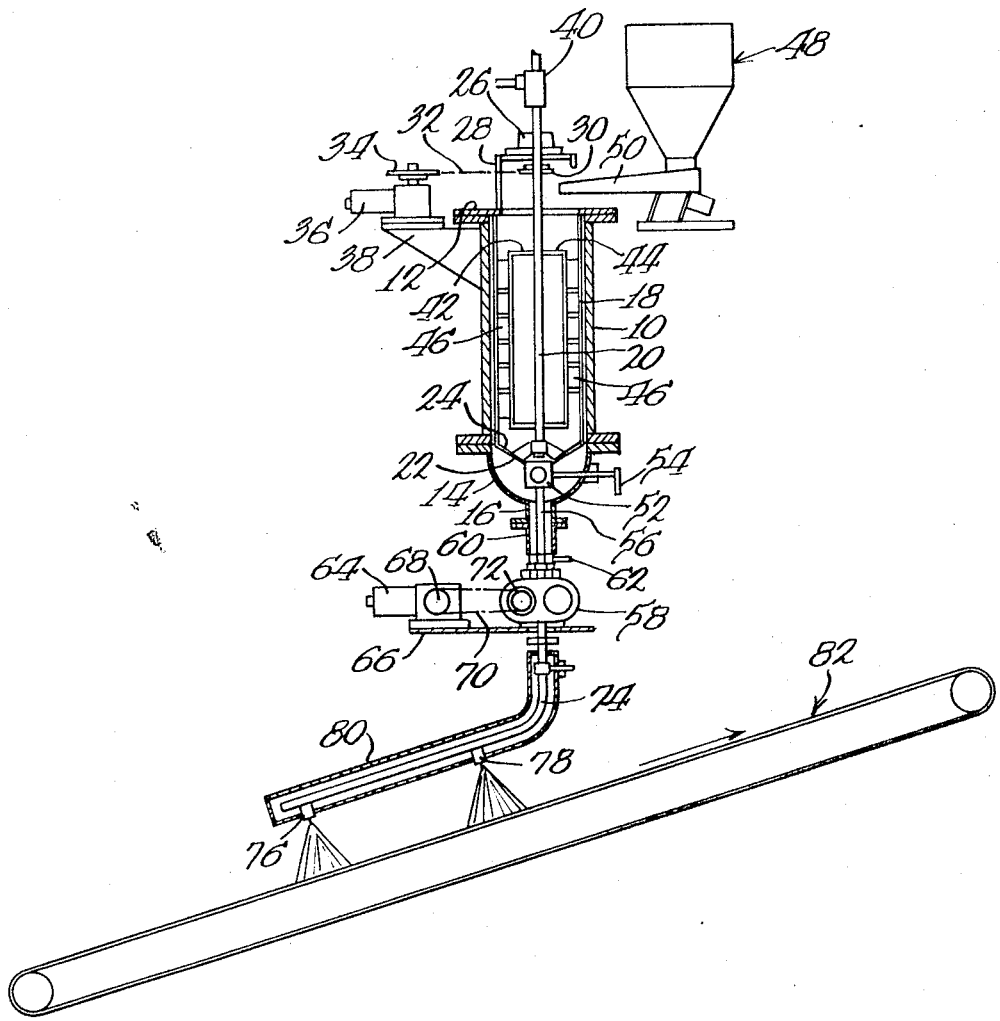

3,748,150
COMPOSITION CONTAINING FOOD ACID AND SUGAR AND PROCESS FOR MAKING SAME
Charles V. Fulger, Pennfield Township, Battle Creek, Mich., assignor to Kellogg Company
Filed Sept. 10, 1971, Ser. No. 179,338
Int. Cl. C13f 3/00
U.S. Cl. 99—141 R  9 Claims

ABSTRACT OF THE DISCLOSURE

Food acid is melted and applied in atomized form to particulate matter containing acid degradable sugar. The sugar can be in the form of agglomerates or free flowing particles. The temperature of the acid is maintained at a high enough level to evaporate any water contained therein before contact with the sugar, thereby preventing inversion of the sugar.

BACKGROUND OF THE INVENTION

This invention relates to food compositions containing a food acid and a sugar in solid form, and more particularly to a method and product wherein the food acid is bonded to particulate or agglomerated sugar or dry products containing sugar, in order to produce discrete particles or porous clusters.

Food products containing particles of sugar are commonly agglomerated by causing limited contact between the particles under humid conditions, whereby the particles stick together and form porous clusters or agglomerates. One method of forming pulverulent material into agglomerates is by passing the material over a vibrating screen while forcing heated air and steam up through the screen. Another method involves subjecting free falling particles to steam.

The above methods are particularly useful in agglomerating sugar particles, since the humid and heated atmosphere causes the particles to become sticky and cling together. Various problems arise, however, if a quantity of food acid is incorporated into pulverulent material containing sugars or oligosaccharides at any time prior to agglomeration under moist conditions. When conventional agglomerating methods are employed, the food acid tends to invert or degrade the sugar, and the treated material becomes unduly sticky and unmanageable and adheres to or clogs the processing equipment. A mechanical dry mixture of a food acid and an unagglomerated food product containing sugar is undesirable, because the mixture becomes stratified under packaging and storage conditions.

BRIEF SUMMARY OF THE INVENTION

The present invention provides a food product containing food acid and sugar and a method for its manufacture whereby the food acid and sugar are bonded together into a uniform and stable solid composition without exposure to the usual moist atmosphere. In this manner, the food acid does not degrade or invert the sugar, and the resulting composition does not become stratified. More specifically, the novel food acid and sugar composition is prepared by melting the food acid and applying the molten acid to the sugar or food product containing sugar in an atomized or minute droplet form, such as by spraying, whereby the acid droplets become fused or bonded to the sugar product. If the sugar has previously been agglomerated, the subsequent application of acid in molten form does not tend to collapse the agglomerates. Thus, it is possible to produce an agglomerated sugar product containing acid without interfering with the actual agglomerating process. Moreover, the problems inherent in the co-agglomeration of sugar and acid are avoided, and the resulting acid-sugar composition does not become stratified under storage conditions.

THE DRAWING

The figure is a diagrammatic vertical sectional view of an apparatus that may be employed in connection with the method and product of the present invention.

DESCRIPTION OF THE PREFERRED EMBODIMENT

The product of the present invention is prepared by applying atomized molten food acid to a sugar product, which may consist totally of sugar or a composition of sugar and food powders or particles. The term "sugar" as used herein shall be deemed to include sucrose or any of the sugar-like polyoses or oligosaccharides of their mixtures that are rapidly inverted or degraded by organic food acids. Any food acid which may be melted below about 200° C. without excessive deterioration may be employed. Thus, suitable food acids and their melting points comprise malic acid (128° C.), citric acid (152° C.), adipic acid (152° C.), and possibly tartaric acid (170° C.) and succinic acid (188° C.).

The food acid is preferably applied in a continuous manner to moving particles or agglomerates of a sugar product, such as by spraying molten acid onto a moving bed of the sugar product or onto a curtain of free falling material. A suitable apparatus for this purpose is shown in the figure, which broadly comprises means for melting the food acid, and means for applying atomized melt onto successive particles or agglomerates of the sugar material. In the preferred embodiment, the molten acid is applied by spraying, and suitable means are provided to transport molten acid under pressure to spray nozzles directed toward a zone wherein the acid is to be applied.

More specifically, the device comprises a vertically disposed cylindrical container 10 having an upper flanged outlet upon which a partial cover 12 is secured, and a lower end fitting 14 having an outlet 16 therein extending downward from the container. An inner cylindrical member 18 is axially disposed within the cylindrical member 10 and is spaced therefrom to define an annular space in which steam may be circulated. The space within the end enclosure 14 may also be heated with steam, such that the entire container is steam jacketed. It will be understood that any other suitable heating means, such as electrical resistance coils, may be employed to heat the container.

A hollow shaft 20 is centrally or axially disposed in the container 10 and is rotatably mounted at its lower end within a bearing 22 mounted in a slotted support 24 extending inward from the internal surface of the container near the lower end thereof. The upper end of the shaft 20 is rotatably mounted in a bearing 26 carried in a support 28 extending above and externally of the container 10. A sprocket or pulley 30 is secured to the shaft above the cover 12 and is driven by an endless chain or belt 32 extending to a second aligned sprocket or pulley 34 driven by a motor 36, said motor being carried upon a support 38 secured to the container 10. Steam may be circulated through the shaft 20 by means of a rotary fitting 40 having a steam inlet at the top of the shaft.

Two or more pipes such as the opposed pipes 42 and 44 are connected at their ends in fluid communication with the hollow shaft 20 within the container, to enable circulation of steam through said pipes. The pipes 42 and 44 each extend at right angles near the upper and lower enclosed portion of the shaft and comprise intermediate vertical portions adjacent the interior wall of the inner cylindrical member 18, said vertical portions being disposed parallel to the axis of said member. A plurality of vertical scraper blades are mounted on and extend radially from each of the pipes 42 and 44, such that the outer edges of said blades are closely spaced from and parallel to the interior wall of the inner cylindrical member 18. Rotation of the shaft 20 therefore causes rotation of the heated pipes 42 and 44 and blades 46 within the interior of the inner cylindrical member 18, whereby the acid within said member will be agitated and continuously scraped from the heated wall of said member. In this manner, the acid will be rapidly and efficiently melted and fed to the spray apparatus.

A hopper 48 containing solid or granular acid may be provided near the top of the heated container 10 and may have a spout 50 extending over an opening in the cover 12. The hopper may be utilized to continuously feed granular acid to the heated container during a continuous spraying operation. A portion of the lower support 24 is downwardly tapered in the shape of a funnel and defines the lower part of the internal enclosure, whereby molten acid may accumulate therein. A valve 52 is in fluid communication with the bottom outlet of the interior enclosure and regulates the flow of molten acid from said enclosure. The valve 52 is conventionally adjustable by means of an exterior regulating handle 54 that is operatively connected to the valve. It will also be noted that the valve 52 is located in the lower part of the heated container 10 and is therefore heated by circulation of steam within the chamber.

An outlet pipe 56 depends from the valve 52 and extends downward to the exterior of the container 10 and to the inlet of a pump 58. Between the pump 58 and the container 10, the pipe 56 is surrounded by a heated or steam filled sleeve 60, which communicates with the steam jacket of the container. In this manner, the acid is maintained in molten condition after passing outside of the heated container 10. A purge steam connection 62 may be provided near the bottom of the sleeve 60 to enable flushing or purging of internal parts when the valve 52 is closed.

The pump 58 may be of any suitable type, such as a gear pump, and may be steam jacketed or heated to maintain the acid therein in molten condition. A motor 64 carried upon a stationary support 66 drives a sprocket or pulley 68 operatively connected by a chain or belt 70 to an aligned sprocket or pulley 72 of the pump. A pipe 74 extends downward from the outlet of the pump and communicates with one or a plurality of restricted orifice spray nozzles such as 76 and 78, whereby the molten acid is sprayed in the desired direction. The pipe 74 is preferably curved outward and downward away from the axis of the shaft 20 and terminates in a lower angularly disposed straight portion in which the spray nozzles 76 and 78 are mounted. The pipe 76 is closed at its free end and may be jacketed by a sleeve 80 to enable the introduction of steam for the purpose of heating the pipe. If necessary, the nozzles 76 and 78 may also be separately heated by electrical coils or the like to assure free flow of the molten acid therethrough.

An endless belt conveyor 82 is located beneath the spray nozzles 76 and 78, the purpose of which is to carry an endless bed of carbohydrate material past the spray nozzles in the direction indicated by the arrow. In this manner, a bed of agglomerated or particulate material may be continuously passed through a zone of acid application. If desired, the sprayed material may be turned over by means of a rack or a plow and resprayed, in order that the material will have an acid coating on substantially all sides.

In operation, suitable granular or powdered food acid is introduced into the container 10 from the hopper 48. The container 10 is heated by steam or by other means to a degree sufficient to melt the acid. During the melting process, the acid is agitated by rotation of the shaft 20, pipes 42 and 44, and scraper blades 46, and molten acid accumulates at the bottom of the container. The liquid molten acid is pumped by the pump 58 under pressure to the spray nozzles 76 and 78. At the same time, granulated or agglomerated food containing sugar is deposited at the bottom of the driven conveyor 82. Movement of the conveyor in the direction indicated by the arrow therefore causes the bed of granules to be exposed successively to the respective spray from the nozzles 76 and 78.

The temperature of the container is preferably adjusted to within 2 to 10 degrees C above the melting point of the acid to assure that the acid will be completely melted. Care must be taken to maintain the temperature below that level which would allow possible thermal decomposition of the acid. For example, if citric acid having a melting point of about 153 degrees C is employed, the temperature should be maintained within the range of about 154 to 160 degrees C, preferably at about 155 degrees. If necessary, the spray nozzles 76 and 78 may be heated to higher temperatures without serious detriment to the acid, in order to introduce additional heat to the sprayed particles and assure fusion of the particles with the food.

In addition to the use of pure molten acid, a mixture containing the acid and a minor proportion of water may be employed; the temperature of the resulting liquid, however, must be maintained at a high enough level to substantially evaporate the water from the spray and thus prevent undue degradation of the crystalline structure of the sugar. In general, it has been found that up to about 20% by weight of water may be incorporated into the liquid acid if the temperature of the spray is maintained above 100° C. It will be appreciated that the addition of even small quantities of water may cause highly soluble acids to go into solution, but the essential characteristics of such highly concentrated and hot solutions are substantially equivalent to a true molten bath for the purposes of the present invention. In the context of the present invention, therefore, the term "molten" shall be deemed to include the aforesaid equivalent.

An advantage of the presently described apparatus is its ability to vary the amount of acid applied to a food material. The amount of acid deposited on the food may be varied by controlling the speed of the conveyor 82 or by regulating the speed of the pump 58. Proportionate amounts of up to 50% of acid to food may be applied without detriment to the carbohydrate.

The resulting product is in the form of free-flowing discrete particles or agglomerates of sugar or sugar-containing materials having contiguous coatings or partial coatings of food acid bonded or fused thereto. If the sugar is first agglomerated into porous clusters before treatment with the atomized molten acid, the resultant product is also porous and maintains a high degree of instantness. Morevoer, the application of food acid by the method herein described does not cause noticeable inversion or degradation of the sugar.

The product of the present invention may be used in many applications and is particularly useful in connection with dry fruit-type beverage mixes that contain food acids and sucrose as primary ingredients. In addition to sucrose and food acid, such as citric acid, the mix may contain coloring and flavoring agents, which enable the mix to be easily converted to beverage form by the addition of cold water.

From the foregoing, it may be seen that obvious modifications may be made in the practice of the present invention without departing from the basic principles thereof. For example, means may be provided to inject molten atomized food acid into a conventional spray tower, whereby the acid is directed against or over granules falling in the tower. Also, the drying tower could be connected to conveyor 82 to allow continuous deposition of agglomerates thereon for exposure to the acid spray.

I claim:

1. Acid-flavored sugar product comprising agglomerates of sucrose having a coating of fused solidified food acid on the surface thereof, said sucrose evidencing no appreciable inversion by said acid.

2. Method for manufacturing a particulate food composition containing sugar and a solid food acid, comprising the steps of melting the food acid, and applying said molten acid in atomized form to particulate matter containing acid degradable sugar, said molten atomized acid being heated to a temperature sufficient to substantially evaporate any water contained therein before contact with said sugar to prevent appreciable inversion of said sugar.

3. The method of claim 2 wherein said acid is atomized by spraying.

4. The method of claim 2 wherein the sugar is sucrose in agglomerated form.

5. Method for manufacturing food compositions containing food acid and acid degradable sugar comprising the steps of first forming the sugar into individual porous clusters, and then treating said clusters with food acid without substantially inverting or degrading said sugar or collapsing the clusters thereof by applying said acid in molten atomized form at a temperature sufficient to evaporate substantially any water present in said acid before contact between said acid and said sugar clusters.

6. The method of claim 5 wherein the step of treating said clusters comprises spraying molten acid onto said clusters.

7. The method of claim 6 wherein successive clusters are moved into and out of a zone of treatment with said molten atomized food acid.

8. The method of claim 5 wherein the molten acid contains up to about 20% water.

9. Method for preparing a sugar and food acid composite material wherein the acid is applied in a liquid form without substantially degrading the sugar or altering the crystalline structure thereof, comprising providing a bath of liquid food acid containing water in the amount of nil to about 20%, and atomizing said liquid acid onto sugar, said acid being maintained at a temperature sufficient to substantially evaporate the water in said acid before said acid impinges upon said sugar.

References Cited
UNITED STATES PATENTS

| | | | |
|---|---|---|---|
| 3,506,457 | 4/1970 | Gidlow et al. | 99—141 R |
| 3,622,352 | 11/1971 | Daylor | 99—140 R |
| 2,603,569 | 7/1952 | Alther et al. | 99—78 |
| 3,619,294 | 11/1971 | Black et al. | 99—78 |
| 3,397,063 | 8/1968 | Carlson et al. | 99—78 |
| 1,841,432 | 1/1932 | Clarke | 127—63 |

FOREIGN PATENTS

| | | | |
|---|---|---|---|
| 1,043,979 | 9/1966 | Great Britain | 99—87 |

JOSEPH SCOVRONEK, Primary Examiner

S. B. DAVIS, Assistant Examiner

U.S. Cl. X.R.

99—78, 166, DIG. 4; 127—29